United States Patent [19]

Loeppky et al.

[11] Patent Number: 5,244,582

[45] Date of Patent: * Sep. 14, 1993

[54] IMMOBILIZED REAGENTS FOR SCAVENGING NITROSATING AGENTS

[75] Inventors: Richard N. Loeppky; Yen T. Bao, both of Columbia, Mo.

[73] Assignee: The Curators of the University of Missouri, Columbia, Mo.

[*] Notice: The portion of the term of this patent subsequent to Feb. 11, 2009 has been disclaimed.

[21] Appl. No.: 833,541

[22] Filed: Feb. 10, 1992

Related U.S. Application Data

[63] Continuation-in-part of Ser. No. 543,349, Jun. 25, 1990, Pat. No. 5,087,671.

[51] Int. Cl.$^5$ .............................................. C02F 1/70
[52] U.S. Cl. ................................... 210/757; 210/749; 210/679; 252/188.1; 564/2
[58] Field of Search ............... 210/679, 690, 719, 725, 210/727, 728, 729, 757, 749; 252/188.1; 564/2

[56] References Cited

U.S. PATENT DOCUMENTS

| | | | |
|---|---|---|---|
| 4,087,561 | 5/1978 | Bharucha et al. | 426/266 |
| 4,273,937 | 6/1981 | Gum et al. | 564/2 |
| 4,609,383 | 9/1986 | Bonaventura et al. | 210/640 |
| 5,087,671 | 2/1992 | Loeppky et al. | 525/328.2 |

OTHER PUBLICATIONS

Taylor, "A Convenient Preparation of a Hydroquinone Redox Polymer", J. Applied Polymer Science, vol. VI, Issue 21, May 3, 1962.

Gray et al., "Inhibition of N-Nitrosamine Formation In Model Food Systems", J. Food Sci. 40, 981–984, 1975.

Groenen, "A New Type of N-Nitrosation Inhibitor," Proc. 2nd Intl. Symp. Nitrite Meat Products, pp. 171–172, 1976.

Univ. of Missouri Technology Catalog, Apr., 1988.

Primary Examiner—Peter Hruskoci
Attorney, Agent, or Firm—Haverstock, Garrett and Roberts

[57] ABSTRACT

This invention relates to reactive groups immobilized on inorganic substrates such as derivatized glass, silica, ceramics, or metals. The immobilized reactive groups can be used to inactivate or remove nitrosating agents in liquids, thereby reducing the formation of potentially carcinogenic nitrosamines and nitroso compounds in liquids that come into contact with humans. The use of inorganic substrates provides several advantages, which include extending the range and adaptability of the method of this invention and allowing its use in liquids that would dissolve or react with organic polymers.

14 Claims, No Drawings

IMMOBILIZED REAGENTS FOR SCAVENGING NITROSATING AGENTS

GOVERNMENT SUPPORT

The research that led to this invention was supported in part by Grant No. R37 CA 26914 from the National Cancer Institute.

RELATED APPLICATION

This invention is a continuation-in-part of application Ser. No. 543,349, filed Jun. 25, 1990 which issued as U.S. Pat. No. 5,087,671 on Feb. 11, 1992.

BACKGROUND OF THE INVENTION

This invention is in the fields of organic chemistry, and relates to compounds that inhibit the formation of nitrosamines that may be carcinogenic, by scavenging and reacting with nitrosating agents.

Background information on nitrosamine and N-nitroso compounds is contained in the specification of the above-cited parent application, the contents of which are hereby incorporated into this application by reference. For convenience, the term "nitrosamine" is used herein to include N-nitroso compounds, since the risks they pose and the methods of removing them from unwanted locations are similar.

Briefly, nitrosamines (and N-nitroso compounds) can be generated when nitrosating agents (such as nitrous acid, $NO_x$, and various nitrous esters, metal nitrites, and nitrosyl or nitro compounds) react with other molecules containing amine groups. The resulting nitrosamines are present as undesired byproducts or contaminants in certain foods and in various liquids that contact skin, including cosmetics, hygiene products such as shampoos, fluids used during various machining or manufacturing processes, hydraulic fluids, pesticides, and other commercial chemicals. They can also be released into the air during certain manufacturing processes such as rubber molding. These exposures pose a health risk, since many nitrosamine and nitroso compounds have been shown to be carcinogenic in tests using laboratory animals. In general, all nitrosamines are presumed to be carcinogenic unless they've been tested and shown to be relatively harmless.

The co-pending parent application cited above disclosed a method of coupling certain types of reactive side groups to organic polymeric backbones. In one preferred embodiment of that invention, the reactive side groups are immobilized on the surfaces of polymeric particles. The immobilized side groups react with nitrosating agents in a liquid which is being treated, in a manner which converts the nitrosating agents into residues that are immobilized on the particles. The particles can then be removed from the liquid by means such as filtering, thereby removing the nitrosating agent and reducing nitrosamine formation in the liquid.

The invention disclosed herein extends that invention by using the same reactive side groups coupled to inorganic substrates, such as glass beads, silica, metal or metal-containing compounds (which can contain ferromagnetic elements such as iron), and ceramic compounds. Extending the range of substrates into the realm of inorganic substances such as glass and metal provides various advantages such as greater rigidity, hardness, temperature stability, potentially lower cost of manufacture, better control of particle size, and the ability to treat liquids which might dissolve, degrade, react with, or otherwise interact in an adverse manner with organic polymers. It also provides additional options for particle removal, such as magnetic attraction if ferromagnetic particles are used, and it allows a wider range of non-particulate substrate configurations, such as stirring paddles, baffles, or fibrous strands having any desired dimensions.

Accordingly, one object of this invention is to disclose that various inorganic substances such as controlled-pore glass, silica, ceramics, or ferromagnetic particles or devices can be used as substrates for immobilizing reactive groups which can inactivate nitrosating agents. Another object is to extend the range of liquids, reaction conditions, separation techniques, and other parameters that are involved when immobilized reactive groups are used to inactivate or remove nitrosating agents and reduce the formation of nitrosamines.

SUMMARY OF THE INVENTION

This invention relates to reactive groups immobilized on inorganic substrates such as derivatized glass, silica, ceramics, or metals. The immobilized reactive groups can be used to inactivate or remove nitrosating agents in liquids, thereby reducing the formation of potentially carcinogenic nitrosamines and nitroso compounds in liquids that come into contact with humans. The use of inorganic substrates provides several advantages, which include extending the range and adaptability of the method of this invention and allowing its use in liquids that would dissolve or react with organic polymers.

DESCRIPTION OF THE PREFERRED EMBODIMENTS

This invention relates to a process for reducing nitrosamine formation in fluids, and to compositions of matter used to carry out this process. The process comprises the step of contacting a fluid (such as a liquid, emulsion, or gas) containing a nitrosating agent with an inorganic substrate, such as derivatized glass, silica, ceramic, or metal, having reactive groups immobilized on the surfaces of the substrate. The reactive groups will react with nitrosating agents and convert the nitrosating agents into residues that cannot degrade nitrogen-containing compounds into potentially carcinogenic nitrosamines or N-nitroso compounds.

As used herein, "residue" is defined broadly to include any compound formed by the reaction of a nitrosating agent with the reactive groups of this invention. Depending on what type of reactive groups are used, some residues will be immobilized on the substrate, and will be removed from the liquid when the substrate is removed by means such as filtration. Alternately, a residue which is not polymeric can be created if a nitrosating agent is converted into a non-nitrosating molecule which is not attached to the polymer.

Suitable reactive agents that can be immobilized on the substrates described herein can be grouped into three categories:

(1) unsaturated electron-rich aromatic molecules such as pyrrole or indole or derivatives thereof; preferably, the electron-rich aromatic groups useful for agents of this category should have a pKa value of greater than about 4.4 if coupled to a carboxyl group.

(2) reducing agents such as hydroquinone or catechol or derivatives thereof; preferably, the electron-rich aromatic groups useful for agents of this category should have a reduction potential of less than 1 volt compared to a hydrogen electrode.

(3) amine groups and other amino compounds, which can be converted into nitrosamines by the nitrosating agents, thereby exhausting the nitrosating agents; after the nitrosating reaction, the nitrosamines can be removed from the fluid by removing the substrate on which they are immobilized.

All three types of reactive agents are described in detail in the co-pending parent application, which issued as U.S. Pat. No. 5,087,671. That discussion has been incorporated by reference and will not be repeated herein, since the improvement in the subject invention relates to substrates rather than reactive groups.

One preferred class of substrates for use herein comprises controlled-pore glass (CPG) beads. As used herein, "glass" refers to a hardened and brittle compound that is composed primarily of silicon dioxide, in a molecular matrix which (unlike quartz) does not have a regular crystalline lattice. Silicon dioxide molecules exposed at the surface of glass can be derivatized by chemical treatment to create pendant moieties which can subsequently be used to couple other molecular groups to the beads. In most types of CPG beads, the surface molecules are modified to contain hydroxyl groups. This treatment process, in addition to providing moieties which can be reacted with other compounds to immobilize the compounds on the beads, also tends to increase the accessible surface area of the beads by causing the formation of very small pores in the surfaces of beads.

In contrast to glass, the term "silica" is normally used to refer to silicon-oxygen containing compounds which have higher concentrations of hydroxyl moieties. Silica contains hydroxyl groups throughout the molecular matrix, since it is usually made from different starting materials rather than by surface treatment of glass.

As used herein, "ceramic" refers to hardened materials containing significant quantities of minerals other than, or in addition to, silicon dioxide or transition metals. Some ceramics have regular crystalline molecular matrices; others do not.

The chemistry for creating CPG beads, silica, and numerous ceramics are all well-known, and all three classes of substrates are commercially available in forms that are suitable for use as starting materials as described herein, with accessible moieties (such as hydroxyl groups) that can be used to immobilize other compounds on the solid substrate material.

As mentioned above, various types of metal or metal-containing compounds (such as oxides) can also be used as described herein, provided that reactive groups such as hydroxyl groups are coupled to the substrate material and are accessible for reaction with anti-nitrosating agents as described herein. The chemistry involved in coupling reactive groups to metal-containing particles is well known to those skilled in that field of art. This approach can allow the use of ferromagnetic particles, which in turn would enable the use of magnetic fields to remove the particles from a treated liquid. Such an approach could be used in treating highly viscous fluids, suspensions that contain desirable solids, and other such fluids that cannot be easily filtered.

Numerous types of reagents can be reacted with hydroxyl moieties to form relatively stable covalent bonds. In general, any reagent which has a reactive group capable of forming an ester, ether, carbamate, or siloxane bond when reacted with a hydroxyl group coupled to CPG can be used as described herein. For example, to couple pyrrole moieties to CPG beads, a pyrrole ring can be coupled to a spacer molecule (such as an alkyl chain having about 3 to 10 atoms) which contains, at the other end of the spacer molecule, a carboxyl group which is activated by mixing the reagent in an acid-chloride or acid-anhydride system. The activated carboxyl group will react with a hydroxyl group that is immobilized on a CPG bead, to form an ester linkage. This effectively bonds the spacer chain and pyrrole group to the CPG bead. Similarly, ether linkages can be created by using reagents containing derivatized epoxide, ethylene imine, or alkyl halide groups; carbamate linkages can be obtained by using reagents containing isocyanate groups; and siloxane linkages can be obtained using reagents containing trimethoxysilyl moieties. The preferred method of linkage (which is largely a matter of yield and economics) can be determined for any particular combination of substrate material (which includes a reactive moiety coupled to the substrate) and anti-nitrosation compound (such as a pyrrole or hydroquinone ring), using routine experimentation.

The use of inorganic substrates such as glass, silica, or metal provides a number of advantages compared to organic polymers as substrates. For example, inorganic substrates are often easier and less expensive to manufacture, they can provide better control of particle size if particles are used, and they allows a wide range of non-particulate configurations such as stirring paddles, baffles, or fibrous strands woven into filters. They can also be used to treat liquids which might dissolve, degrade, react with, or otherwise interact in an adverse manner with organic polymers, and they can be used at wider ranges of temperature, acidity, and alkalinity.

EXAMPLES

EXAMPLE 1

Creation of PEI-modified Glass Beads

Controlled-pore glass (CPG) beads (average pore size 242 angstrom, 120–200 mesh, surface area 88.1 $m^2/g$) were purchased from Sigma Chemical Company, St. Louis (catalog number PG-240-200). Trimethoxysilylpropyl-substituted polyethyleneimine (PEI) was purchased from Petrarch Systems (Bristol, Pa., catalog number PS 076, average molecular weight 1500–2000 daltons, stored and shipped as a 50% solution in 2-propanol). The silyloxy groups of the modified PEI can be hydrolyzed to give free silanols, which can form hydrogen-bonded arrays with the free SiOH groups on a glass surface. Upon curing or heating which expels some water molecules, these arrays will be converted into covalent siloxane linkages, as shown below. This reaction was used to bind the substituted polyethyleneimine to the CPG beads.

In specific, a solution of 2.42 g of substituted PEI in 2-propanol (18.8% w/w) was prepared by adding 4.84 g of a 50% solution of polymer in 2-propanol to 8.04 g 2-propanol. CPG beads (1.03 g) were added and incubated for an hour at room temperature; during incubation, the suspension was periodically mixed by vortexing. Residual PEI was removed by allowing the beads to settle then removing the supernatant. 2-propanol (15 ml) was added and mixed by vortexing, the beads were allowed to settle, and the supernatant was again removed. The process was repeated two more times with 15 ml 2-propanol. The beads were dried in air for 20 hours to cure them, then any remaining unbound polymer was removed by washing with 3×15 ml ethanol on a fritted glass funnel followed by overnight drying in vacuo at room temperature, giving 1.16 g product. The amine content of the beads was determined on samples (about 22 mg each) of beads by the method of Gisin, *Anal. Chim. Acta* 58: 248 (1972), as follows; after each step, the reagent was removed as supernatant after the beads were allowed to settle. The sample of PEI-treated beads were first allowed to swell in 1 ml $CH_2Cl_2$ for 5 minutes, then they were neutralized with 1 ml 5% (v/v) diisopropylethylamine in $CH_2Cl_2$ (2 times, 3 minutes each). They were then washed with 1 ml $CH_2Cl_2$ (3 times, 2 minutes each), and treated with 2 ml 0.1M picric acid in $CH_2Cl_2$ (2 times, 3 minutes each). They were then washed with 2 ml $CH_2Cl_2$ (6 times, 2 minutes each). The picrate was eluted with 2 ml of the above diisopropylethylamine solution in $CH_2Cl_2$ (2 times, 5 minutes each) then with 2 ml $CH_2Cl_2$ (4 times, 2 minutes each). All eluates were combined in a 50 ml volumetric flask, and diluted to 50 ml with 95% ethanol. A 1 ml aliquot was diluted to 10 ml in volumetric flask with 95% ethanol and the absorbance at 358 nm was determined. The amine content of the beads, derived from the molar absorptivity of diisopropylethylamine picrate at 358 nm = 14500, was 0.80±0.05 mmole/g (n=2).

These PEI-treated CPG beads were tested to determine their ability to inhibit nitrosation, as discussed in Example 3.

EXAMPLE 2

Addition of Pyrrole Groups to the PEI-Modified Beads

Pyrrole groups were reacted with some of the unprotected secondary amine groups in the PEI backbone, as follows. A sample of the PEI-treated CPG beads (600 mg, 0.45 mmole amine) was added to 6 ml water. Concentrated HCl was added to lower the pH to 2 (about 4 drops were needed). Formalin was added (36 microliters (ul) of 37% solution, 0.48 mmole) and the mixture was mixed well for 15 minutes and then added to a solution of pyrrole (32 ul, 0.46 mmole) in water (1 ml). After stirring for an hour, another 32 ul of pyrrole was added and the stirring was continued for 20 hours. The mixture turned pink at first then dark brown during that time. Aqueous 25% NaOH (about 5 drops) was added to make the mixture alkaline. The product was filtered on a fritted-glass funnel, washed with 5×15 ml water and 5×15 ml ethanol, dried in vacuo at room temperature overnight, giving 599 mg. No attempt was made to determine the pyrrole content of the beads. The chemical structure of the beads was as follows:

EXAMPLE 3

Testing the Beads for Nitrosation Inhibition

The ability of the derivatized CPG's to inhibit nitrosamine formation was tested as follows. The CPG beads belonged in three different groups: (1) unmodified CPG; (2) CPG modified by the addition of the PEI, as described in Example 1; and (3) CPG modified by the addition of both PEI and pyrrole, as described in Example 2. The assays involved the conversion of morpholine (MOR, a highly susceptible amine compound) to nitrosomorpholine (NMOR) in the presence of acidic sodium nitrite ($HNO_2$, a very strong nitrosating agent). That conversion was tested in the absence of any beads, and in the presence of all three types of beads.

To test each type, beads were weighed into a 4 dram vial, 3 ml glacial acetic acid was added, followed by N-nitroso-2,6-dimethylmorpholine (DMNM, used an an internal standard) and morpholine. The mixture was equilibrated with stirring for 15 minutes in a water bath at 37° C. Sodium nitrite ($NaNO_2$, 100 ul) of a 2M solution, $2\times10^{-4}$ mmole) was added and allowed to react for 30 minutes.

Untreated beads and beads derivatized with trimethoxysilylpropyl PEI were handled as follows. The supernatant was added to 15 ml 2M $K_2CO_3$ in a 100 ml round bottom (RB) flask. A $K_2CO_3$ (5 ml) solution cautiously was added to the residue and mixed. The beads were allowed to settle and the supernatant was again transferred to the RB flask. The process was repeated 2 more times. The beads were then washed with 2×5 ml $H_2O$ and 2×5 ml methanol (MeOH), all supernatants were added to the RB flask. Most of the MeOH was removed using a rotary evaporator, and the remainder of the RB content was extracted with 4×10 ml $CH_2Cl_2$. The combined extracts was analyzed for NMOR using gas chromatography with a flame ionization detector.

Some of the beads derivatized with pyrrole were broken by stirring during the derivatization process and became very fine. Since these did not settle easily for the removal of the supernatant, centrifugation was necessary. The reaction mixture was carefully added to 15 ml of 2M $K_2CO_3$ solution in a 50 ml centrifuge tube. The vial was rinsed with 2×7.5 ml of 2M $K_2CO_3$ which was also added to the centrifuge tube, which was then centrifuged for 5 minutes at 1000 G. The supernatant was transferred to a RB flask. The residue was washed with 2×5 ml $H_2O$ and 2×5 ml MeOH, each time, centrifugation was used and the supernatant was transferred to the same RB flask. The rest of the work-up was the same as described for the other beads.

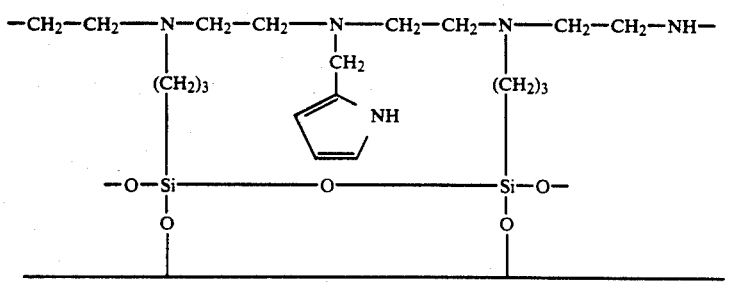

Glass Bead

The percentage results in Table 1 are calculated as follows: NMOR formation in the presence of the inhibitor is divided by NMOR formation in the absence of the inhibitor, then multiplied by 100 to convert the fraction to a percentage. A low percentage indicates that the inhibitor effectively inactivated the sodium nitrite before the nitrite could convert the MOR to NMOR.

The percentages shown in Table 1 indicate the following:

1. CPG beads derivatized with PEI (which has accessible amine groups that can react with and inactivate nitrosating agents derived from nitrite or other substances) caused an initial inhibition of nitrosamine formation; NMOR formation in the presence of the PEI-treated beads was less than half (46% and 37%) of the NMOR formation in the absence of the beads.

2. CPG beads derivatized by PEI and then modified to also contain pyrrole groups coupled to the PEI caused an even higher level of inhibition; NMOR formation in the presence of the PEI/pyrrole beads was only 21% of the NMOR formation in the absence of the beads.

TABLE 1

| Inhibition effect of derivatized CPG beads on NMOR formation | | |
|---|---|---|
| Polymer | Polymer weight | NMOR % |
| CPG derivatized with Trimethoxysilylpropyl substituted PEI, run 1 | 250 mg | 46.3 + 2.4 (n = 2) |
| As above, run 2 | 240 mg | 37.5 + 0.6 (n = 2) |
| As above, run 3, derivatized with pyrrole | 250 mg | 21.1 + 2.1 (n = 2) |
| Untreated CPG (control) | 250 mg | 70.3 + 2.4 (n = 3) |
| Reaction conditions | | |
| 3 ml glacial acetic acid | | |
| Amine content in polymer = approx $2 \times 10^{-4}$ mole | | |
| Morpholine = $2 \times 10^{-4}$ mole | | |
| $NaNO_2$ = $2 \times 10^{-4}$ mole | | |

We claim:

1. A method for reducing the concentration of an unwanted nitrosating agent in a fluidized material, comprising the step of contacting a fluidized material containing an unwanted nitrosating agent with reactive groups bonded to an inorganic substrate, under conditions that allow the reactive groups to convert the unwanted nitrosating agent into residue molecules that cannot react with amine compounds in solution to degrade the amine compounds into nitrosamines or nitroso compounds.

2. The method of claim 1 wherein the reactive groups comprise electron-rich aromatic groups.

3. The method of claim 2 wherein the electron-rich aromatic groups would have a pKa value of greater than about 4.4, if coupled to a carboxyl group and not coupled to a polymer.

4. The method of claim 2 wherein the electron-rich aromatic groups are selected from the class of compounds consisting of:
   a. pyrrole groups;
   b. pyrrole derivatives formed by ring substitution or fusion wherein a substituent which is coupled to pyrrole to form the pyrrole derivatives is either neutral or electron-donating relative to hydrogen;
   c. indole;
   d. derivatives of indole formed by ring substitution or fusion;
   e. derivatives of benzene, thiophene, or furan containing electron-donating substituents.

5. The method of claim 1 wherein the reactive groups comprise reducing groups having a reduction potential of less than 1 volt compared to a hydrogen electrode.

6. The method of claim 5 wherein the reducing groups are selected from the groups consisting of hydroquinone and derivatives thereof and catechol and derivatives thereof.

7. The method of claim 1 wherein the reactive groups comprise primary or secondary amine groups, and the conditions allow the unwanted nitrosating agent to convert the primary or secondary amine groups into nitrosamines or nitroso groups that remain covalently bonded to the inorganic substrate.

8. A composition of matter, comprising a fluid which contains:
   a. an unwanted nitrosating agent which is present as a contaminating by-product in an otherwise useful chemical mixture; and,
   b. reactive groups capable of reacting with the unwanted nitrosating agent, in a quantity sufficient to convert a substantial portion of the unwanted nitrosating agent into residues that cannot degrade amine compounds into nitrosamines or nitroso compounds, coupled to an inorganic substrate.

9. The composition of matter of claim 8, wherein the reactive groups comprise electron-rich aromatic groups.

10. The composition of claim 9, wherein the electron-rich aromatic groups would have a pKa value of greater than about 4.4, if coupled to a carboxyl group and not coupled to a polymer.

11. The composition of matter of claim 9 wherein the electron-rich aromatic groups are selected from the class of compounds consisting of:
   a. pyrrole groups;
   b. pyrrole derivatives formed by ring substitution or fusion wherein a substituent which is coupled to pyrrole to form the pyrrole derivatives is either neutral or electron-donating relative to hydrogen;
   c. indole;
   d. derivatives of indole formed by ring substitution or fusion;
   e. derivatives of benzene, thiophene, or furan containing electron-donating substituents.

12. The composition of matter of claim 8 wherein the reactive groups comprise reducing groups having a reduction potential of less than 1 volt compared to a hydrogen electrode.

13. The composition of matter of claim 12 wherein the reducing groups are selected from the groups consisting of hydroquinone or derivatives thereof and catechol or derivatives thereof.

14. The composition of matter of claim 8 wherein the reactive groups comprise primary or secondary amine groups, and the conditions allow the unwanted nitrosating agent to convert the primary or secondary amine groups into nitrosamines or nitroso groups that remain covalently bonded to the inorganic substrate.

* * * * *

UNITED STATES PATENT AND TRADEMARK OFFICE
CERTIFICATE OF CORRECTION

PATENT NO. : 5,244,582
DATED : September 14, 1993
INVENTOR(S) : Loeppky et al

It is certified that error appears in the above-indentified patent and that said Letters Patent is hereby corrected as shown below:

Column 5, line 4, "in vacuo" should be --in vacuo--.

Column 5, line 8, "Anal. Chim. Acta 58:" should be  -Anal. Chim. Acta 58:--.

Column 5, line 48, "in vacuo" should be --in vacuo--.

Signed and Sealed this

Twentieth Day of September, 1994

Attest:

BRUCE LEHMAN

Attesting Officer

Commissioner of Patents and Trademarks